(12) United States Patent
Roos et al.

(10) Patent No.: US 11,904,823 B2
(45) Date of Patent: Feb. 20, 2024

(54) HYDRAULIC BLOCK FOR A HYDRAULIC POWER UNIT OF A HYDRAULIC POWER VEHICLE BRAKING SYSTEM

(71) Applicant: Robert Bosch GmbH, Stuttgart (DE)

(72) Inventors: Karl-Heinz Roos, Blaichach (DE); Markus Berktold, Sonthofen (DE); Maximilian Wilhelm, Buchenberg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 17/448,261

(22) Filed: Sep. 21, 2021

(65) Prior Publication Data

US 2022/0097667 A1 Mar. 31, 2022

(30) Foreign Application Priority Data

Sep. 28, 2020 (DE) .................. 102020212176.1

(51) Int. Cl.
| | |
|---|---|
| *B60T 17/00* | (2006.01) |
| *F15B 15/20* | (2006.01) |
| *B60T 7/04* | (2006.01) |
| *B60T 11/18* | (2006.01) |
| *B60T 8/34* | (2006.01) |
| *B60T 8/36* | (2006.01) |
| *B60T 11/16* | (2006.01) |
| *B60T 11/22* | (2006.01) |

(52) U.S. Cl.
CPC .............. *B60T 17/00* (2013.01); *F15B 15/20* (2013.01); *B60T 7/042* (2013.01); *B60T 8/343* (2013.01); *B60T 8/3675* (2013.01); *B60T 11/16* (2013.01); *B60T 11/18* (2013.01); *B60T 11/22* (2013.01)

(58) Field of Classification Search
CPC .......... B60T 17/00; B60T 7/042; B60T 8/343; B60T 8/3675; B60T 11/18; B60T 11/16; B60T 11/22; F15B 15/20
USPC .......... 137/351; 188/322.13, 322.15; 303/71, 303/9.75
See application file for complete search history.

(56) References Cited

U.S. PATENT DOCUMENTS

| | | | | |
|---|---|---|---|---|
| 5,178,441 A | * | 1/1993 | Heibel .................... | B60T 7/042 303/119.2 |
| 5,427,442 A | * | 6/1995 | Heibel .................... | B60T 13/72 303/114.3 |
| 5,865,510 A | * | 2/1999 | Poertzgen ............. | B60T 8/4086 60/582 |
| 6,494,546 B1 | * | 12/2002 | Feigel ................... | B60T 17/222 303/114.1 |
| 2015/0075370 A1 | * | 3/2015 | Murayama ............. | B23P 15/10 92/187 |

(Continued)

FOREIGN PATENT DOCUMENTS

WO 2017137135 A1 8/2017

*Primary Examiner* — Minh Q Le
(74) *Attorney, Agent, or Firm* — NORTON ROSE FULBRIGHT US LLP; Gerard A. Messina

(57) ABSTRACT

For fastening an mounting part to a hydraulic block of a hydraulic power unit of a hydraulic power vehicle braking system, holes are configured in a fastening flange of the mounting part with collars, which are clampingly inserted in mounting holes of the hydraulic block. A perforated disk is situated on the fastening flange as a fastening part and is fastened by screws screwed into the mounting holes of the hydraulic block.

8 Claims, 2 Drawing Sheets

(56) References Cited

U.S. PATENT DOCUMENTS

| | | | |
|---|---|---|---|
| 2016/0113155 A1* | 4/2016 | Koga | F16D 65/78 |
| | | | 188/152 |
| 2016/0121864 A1* | 5/2016 | Misunou | B60T 11/28 |
| | | | 60/591 |
| 2017/0190328 A1* | 7/2017 | Nakazawa | B60T 7/042 |
| 2018/0201247 A1* | 7/2018 | Koshimizu | B60T 11/34 |
| 2018/0257622 A1* | 9/2018 | Saito | B60T 8/368 |
| 2020/0216049 A1* | 7/2020 | Alili | B60T 11/26 |
| 2020/0216053 A1* | 7/2020 | Ahn | B60T 8/343 |
| 2021/0122346 A1* | 4/2021 | Ahn | B60T 8/368 |
| 2021/0129816 A1* | 5/2021 | Weh | B60T 13/12 |
| 2021/0309197 A1* | 10/2021 | Weh | B60T 8/343 |
| 2022/0205812 A1* | 6/2022 | Kim | B60T 7/042 |

* cited by examiner

HYDRAULIC BLOCK FOR A HYDRAULIC POWER UNIT OF A HYDRAULIC POWER VEHICLE BRAKING SYSTEM

CROSS REFERENCE

The present application claims the benefit under 35 U.S.C. § 119 of German Patent Application No. DE 102020212176.1 filed on Sep. 28, 2020, which is expressly incorporated herein by reference in its entirety.

FIELD

The present invention relates to a hydraulic block for a hydraulic power unit of a hydraulic power vehicle braking system.

BACKGROUND INFORMATION

PCT Patent Application No. WO 2017/137 135 A1 describes a hydraulic power unit for a slip-controlled hydraulic power vehicle braking system including a cuboidal, flat hydraulic block, which has a master brake cylinder borehole and, transverse to the master brake cylinder borehole, a power cylinder borehole, which extends through the hydraulic block from a large side to an opposite large side. The master brake cylinder borehole is provided in parallel to the two large sides in the hydraulic block and has an opening at a narrow side of the hydraulic block, which is fastened to a bulkhead of a motor vehicle. In the extension of the master brake cylinder borehole, a hollow mounting part is situated at the narrow side of the hydraulic block, which encloses a master brake cylinder piston protruding from the hydraulic block in a basic position. The mounting part includes a fastening flange including two through-holes opposite each other, which are aligned with mounting holes in the narrow side of the hydraulic block outside the master brake cylinder borehole. A perforated disk-shaped mounting part is situated on the fastening flange of the mounting part, which has through-holes which are aligned with the through-holes of the fastening flange and the mounting holes in the hydraulic block and through which the fastening part and the mounting part are fastened to the narrow side of the hydraulic block with the aid of screws which are screwed into the mounting holes of the hydraulic block. From the fastening part, stud bolts protrude away from the hydraulic block for the fastening to the bulkhead.

SUMMARY

A hydraulic block according to the present invention is provided for a hydraulic power unit of a hydraulic vehicle braking system, in particular, for a hydraulic power vehicle braking system and/or a slip-controlled vehicle braking system. Slip controllers are, in particular, an anti-lock braking unit, a traction control and/or vehicle dynamics control unit/electronic stability program, for which the abbreviations ABS, TCS and/or VDC/ESP are common. The latter are also colloquially referred to as "anti-skid control units." Slip controllers are conventional and are not discussed in greater detail here.

The hydraulic block is used to mechanically fasten and hydraulically interconnect hydraulic components of the vehicle braking system or its brake pressure control and/or slip control. Such hydraulic components are, among other things, solenoid valves, check valves, hydraulic accumulators, damper chambers, and pressure sensors. For a power vehicle braking system, the hydraulic block includes a power brake pressure generator, the power brake pressure generator usually including a piston-cylinder unit which is accommodated in a power cylinder borehole of the hydraulic block. For a brake pressure generation, a power piston is displaced with the aid of an electric motor via a threaded drive in the power cylinder borehole. The electric motor is applied to the outside of the hydraulic block.

The hydraulic components are fastened in receptacles in the hydraulic block, which are usually designed as cylindrical through-holes or blind holes, partially with stepped diameters. "Interconnection" means that the receptacles or the hydraulic components fastened therein are connected by lines in the hydraulic block corresponding to a hydraulic diagram of the vehicle braking system or its slip controller. The lines are typically drilled in the hydraulic block.

Equipped with the hydraulic components of the vehicle braking system or its slip controller, the hydraulic block forms the hydraulic power unit, "equipped" meaning that the hydraulic components are fastened in the respective receptacles of the hydraulic block intended for them.

Hydraulic wheel brakes of the vehicle braking system are connected to the hydraulic block via brake lines.

The hydraulic block according to an example embodiment of the present invention has a master brake cylinder borehole, in which a master brake cylinder piston is displaceable for generating a brake pressure by muscle power with the aid of a foot brake pedal. The master cylinder borehole has an opening at a side of the hydraulic block which is referred to as the fastening side here. Outside the master brake cylinder borehole, the hydraulic block has at least one mounting hole, preferably including an internal thread in the fastening side.

A mounting part is situated at the fastening side of the hydraulic block, which has an opening for the master brake cylinder piston covering the opening of the master brake cylinder borehole in the hydraulic block. In addition, the mounting part has at least one through-hole which is aligned with the at least one mounting hole in the fastening side of the hydraulic block.

The hydraulic block according to an example embodiment of the present invention includes a fastening part, which is situated on the mounting part, for fastening the hydraulic block to the bulkhead of the motor vehicle. The fastening part has a through-opening for the master brake cylinder piston which covers the opening of the mounting part and the opening of the master brake cylinder borehole in the hydraulic block, and at least one through-hole which covers the at least one through-hole of the mounting part and the at least one mounting hole in the fastening side of the hydraulic block.

For fastening the mounting part and the fastening part to the fastening side of the hydraulic block, at least one fastening element is fastened in the at least one mounting hole of the hydraulic block, which extends through the through-holes in the mounting part and in the fastening part. The fastening element may, for example, be a screw, a threaded bolt or, in general, a screw element and be screwed into the mounting hole of the hydraulic block. The fastening element may, for example, also be a bolt or a pin which is riveted, welded or fastened in another manner in the mounting hole of the hydraulic block. The enumeration is by way of example and not exhaustive.

The mounting part includes a, for example, tubular collar at its at least one through-hole, which clampingly, in the manner of a plug, engages in the at least one mounting hole in the fastening side of the hydraulic block and through which the at least one fastening element extends, which is fastened in the at least one mounting hole in the hydraulic block.

Due to the at least one collar clampingly inserted into the at least one mounting hole, the mounting part is provisionally fastened to the fastening side of the hydraulic block until it is finally fastened to the hydraulic block with the aid of the fastening part and/or the at least one fastening element.

The mounting part preferably includes a fastening flange including the at least one through-hole on which the, for example, perforated disk-shaped fastening part is situated.

Refinements and advantageous embodiments of the present invention are disclosed herein.

All features described in the description and shown in the figures may be implemented in specific embodiments of the present invention either alone or in a generally arbitrary combination. Embodiments of the present invention which do not include all, but only one or multiple features of a specific embodiment of the present invention are generally possible.

BRIEF DESCRIPTION OF THE DRAWINGS

The present invention is described in greater detail hereafter based on one specific embodiment shown in the figures.

DETAILED DESCRIPTION OF EXAMPLE EMBODIMENTS

Figure 1:
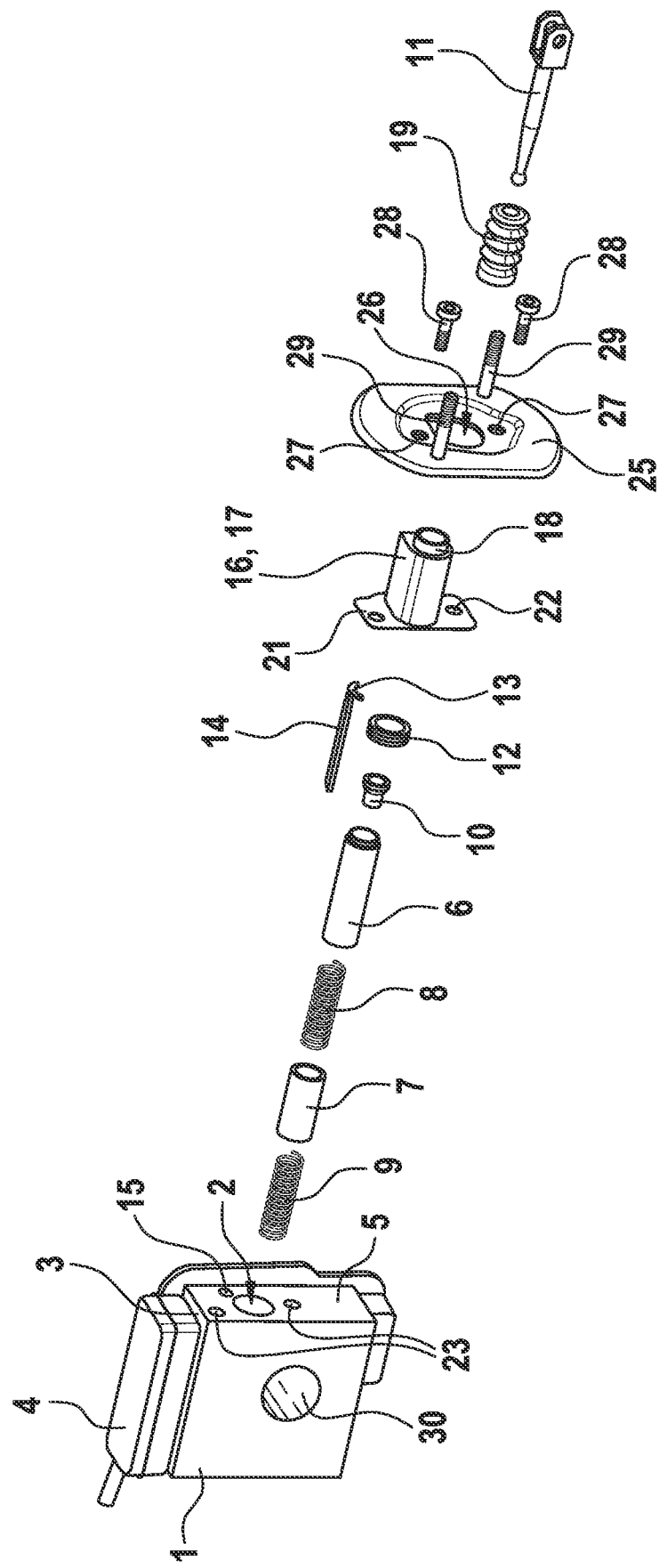
FIG. 1 shows a simplified perspective exploded view of a hydraulic block according to an example embodiment of the present invention.

Hydraulic block 1 according to the present invention illustrated in the figures is intended for a hydraulic power unit of a hydraulic power vehicle braking system including a slip controller. Such slip controllers are, for example, anti-lock braking, traction control and/or vehicle dynamics control units/electronic stability programs, for which the abbreviations ABS, TCS and/or VDC/ESP are common. Slip controllers are conventional and are not discussed here.

In the exemplary embodiment, hydraulic block 1 is a narrow, cuboidal metal block, whose large sides opposite each other are almost square. "Narrow" means that a distance of the two large sides from one another is not greater than half a length or width of the large sides. In the exemplary embodiment, the distance of the two large sides from one another is approximately one quarter to one third of the length or width of the large sides. Other aspect ratios are possible.

Hydraulic block 1 is used for mechanically fastening and hydraulically interconnecting hydraulic components of the slip controller, including a braking pressure control unit of the power vehicle braking system. Such hydraulic components are, among other things, solenoid valves, check valves, hydraulic accumulators, damper chambers, and pressure sensors, which are fastened in receptacles in the hydraulic block. The receptacles are cylindrical counterbores, blind holes and/or also through-holes, which may have stepped diameters and into which the hydraulic components are introduced and fastened in a pressure-tight manner by, for example, a circumferential caulking. The hydraulic components may be recessed in the receptacles or protrude from hydraulic block 1. Equipped with the hydraulic components, hydraulic block 1 forms the hydraulic power unit for the brake pressure generation, brake pressure control, and slip control of the power vehicle braking system.

Hydraulic interconnection means that the receptacles for the hydraulic components are connected by lines leading through hydraulic block 1, corresponding to a hydraulic diagram of the power vehicle braking system or its slip controller. The receptacles and lines form so-called "boreholes" of hydraulic block 1, it being generally also possible for the receptacles and lines to be created in a manner other than boring.

Hydraulic block 1 has a master brake cylinder borehole 2, which is provided in parallel to and in a center between the two large sides in hydraulic block 1. A brake fluid reservoir 4 is placed onto an upper narrow side 3. Upper narrow side 3 is referred to in this way since it is situated at the top in an intended mounting position of hydraulic block 1. In the exemplary embodiment, master brake cylinder borehole 2 is provided in parallel to upper narrow side 3 in hydraulic block 1.

Master brake cylinder borehole 2 is open at a narrow side of hydraulic block 1, i.e., it has an opening at this narrow side of hydraulic block 1 referred to as fastening side 5 here. At an opposite end, master brake cylinder borehole 2 is closed or sealed. Fastening side 5 abuts upper narrow side 3 and, like upper narrow side 3, the two large sides of hydraulic block 1. Fastening side 5 is referred to in this way since it is intended for a fastening to a bulkhead of a motor vehicle, which is not shown. The bulkhead separates a passenger compartment below a windshield from an engine compartment of the motor vehicle. Hydraulic block 1 is fastened to the bulkhead in the engine compartment.

A primary piston 6, which may also be referred to as a rod piston, and a secondary piston 7, which may also be referred to as a floating piston, are displaceably accommodated in master brake cylinder borehole 5. Primary piston 6 and secondary piston 7 may also be interpreted as master brake cylinder pistons 6, 7. In the exemplary embodiment, they are hollow pistons, however this is not mandatory for the present invention. A first piston spring 8 is situated between the two master brake cylinder pistons 6, 7. Secondary piston 7 is supported via a second piston spring 9 at a closed end of master brake cylinder borehole 2.

A pedal rod 11, which protrudes from primary piston 6, is fastened in primary piston 6 in an articulated manner with the aid of a fastening clip 10. With the aid of a (foot) brake pedal, which is not shown here and which is connectable to pedal rod 11 in an articulated manner, primary piston 6 may be displaced in master brake cylinder borehole 2, and may thereby generate a hydraulic brake pressure for an actuation of the vehicle braking system. The brake pressure in master brake cylinder borehole 2 between the two master brake cylinder pistons 6, 7 displaces secondary piston 7.

Primary piston 6 protrudes on fastening side 5 from master brake cylinder borehole 2 and from hydraulic block 1. A follower ring 12 is fixedly situated at an end of primary piston 6 protruding from hydraulic block 1, which includes a circumferential groove at its outer circumference, in which a complementary claw 13 protruding radially from a pin-shaped signal transmitter holder 14 engages so that the signal transmitter holder 14 moves together with primary piston 6. At its end situated further away from claw 13, signal transmitter holder 14 includes a permanent magnet as the signal transmitter, which is situated in signal transmitter holder 14 and therefore not visible.

Signal transmitter holder 14 is situated in parallel to primary piston 6, next to primary piston 6, and extends in a signal transmitter borehole 15, which is provided in parallel to master brake cylinder borehole 2, next to master brake cylinder borehole 2 in hydraulic block 1. Like primary piston 6, signal transmitter holder 14 is partially situated outside hydraulic block 1.

A housing 16, which, in general, may also be interpreted as mounting part 17, is situated at fastening side 5 of hydraulic block 1, at which primary piston 6 and signal transmitter holder 14 moving together with primary piston 9 protrude from hydraulic block 1. In the exemplary embodiment, housing 16 forming mounting part 17 is made up of metal; for example, it is deep-drawn from a metal sheet, however this is not mandatory for the present invention. Housing 16 is a hollow body, and in the exemplary embodiment it is tubular; it may be cylindrical, for example, and generally have any cross-section. It may also vary its cross-section across its length, for example taper in one direction. In the exemplary embodiment, housing 16 forming mounting part 17 has a drop-shaped cross-section, which means that housing 16 includes a cylinder shell-shaped circumferential wall section, which extends over more than 180° and less than 270° in a circumferential direction and is tangentially adjoined by two planar circumferential wall sections, which extend obliquely toward one another and are connected to an also cylinder shell-shaped circumferential wall section, so that a tube shape closed in the circumferential direction results, which encloses primary piston 6 protruding from hydraulic block 1 and signal transmitter holder 14.

At an end situated further away from hydraulic block 1, housing 16 includes a hole which is coaxial to master brake cylinder borehole 2 for pedal rod 11 to pass through. The hole includes a collar 18, to which a hose-shaped bellows 19 is fastened, which ends at pedal rod 11. Housing 16 including bellows 19 protects primary piston 6, signal transmitter holder 14, and master brake cylinder borehole 2 against moisture and dirt.

At fastening side 5 of hydraulic block 1, housing 16 forming mounting part 17 has an opening 20 which covers the opening of master brake cylinder borehole 2.

For a fastening to fastening side 5 of hydraulic block 1, housing 16 forming mounting part 17 includes a fastening flange 21 with the aid of which it is fastened to fastening side 5 of hydraulic block 1. Fastening flange 21 has two through-holes 22 situated opposite one another, which are aligned with two mounting holes 23 of hydraulic block 1. Mounting holes 23 are provided opposite one another with respect to master brake cylinder borehole 2 in fastening side 5 of hydraulic block 1. The two mounting holes 23 are provided in parallel to master brake cylinder borehole 2 outside master brake cylinder borehole 2 at a distance from master brake cylinder borehole 2, which approximately corresponds to the radius of the master brake cylinder borehole, for example, in fastening side 5 of hydraulic block 1. In the exemplary embodiment, mounting holes 23 are blind holes, which include internal threads.

Figure 2:
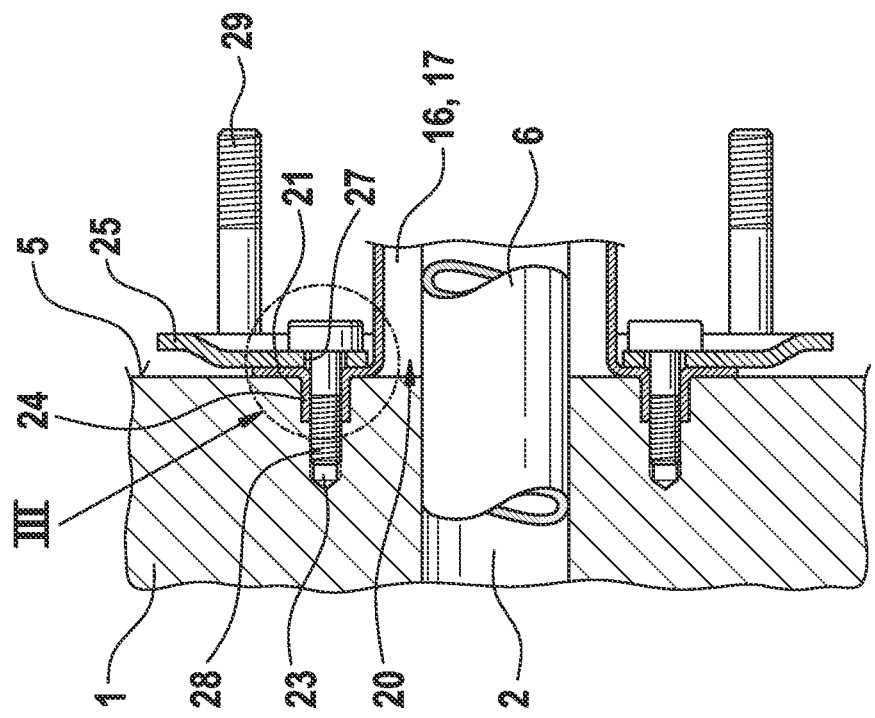
FIG. 2 shows a sectional view of a detail of the hydraulic block of FIG. 1.

Fastening flange 21 of housing 16 forming mounting part 17 includes tubular collars 24 which enclose the two through-holes 22 and are clampingly inserted into the two mounting holes 23 of hydraulic block 1 (FIG. 2). In this way, a plug connection is formed, which holds mounting part 17 at fastening side 5 of hydraulic block 1. A tolerance compensation in the event of a position error between mounting holes 23 in hydraulic block 1 and collars 24 of mounting part 17 takes place by an elastic, or possibly also plastic, deformation of fastening flange 21 and/or of collars 24.

Figure 3:
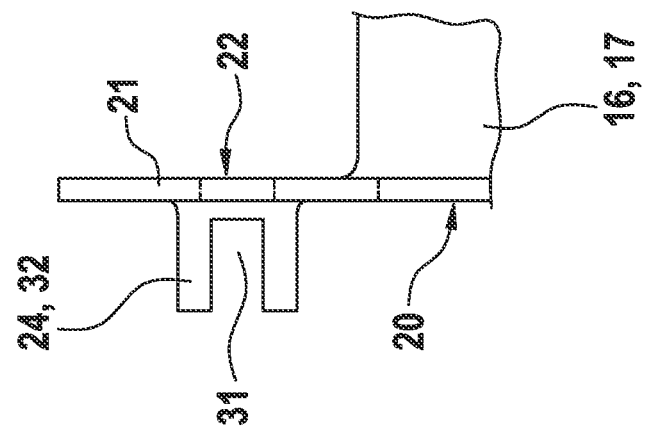
FIG. 3 shows an enlarged detail according to arrow III in FIG. 2.

In the exemplary embodiment, collars 24 include recesses 31 at opposite circumferential points, so that only two hollow cylinder shell-shaped circumferential sections 32 of the tubular collars 24 are present at opposing circumferential points, which are clampingly inserted into mounting holes 23 of hydraulic block 1 (FIG. 3). In this way, a radial spring action for inserting collars 24 into mounting holes 23 is improved. The existing circumferential sections 32 of collars 24 may also be curved in a manner other than cylindrical. Another option is, for example, an outer circumference of collars 24 deviating from the inner circumference of mounting holes 23, i.e., for example, collars 24 having an elliptical cross-section in cylindrical mounting holes 23 (not shown).

A perforated disk rests on fastening flange 21 of housing 16 forming mounting part 17 as fastening part 25, which has a through-opening 26 which encloses the tubular section of housing 16 and covers the opening of master brake cylinder borehole 2. Fastening part 25 has two through-holes 27, which cover through-holes 22 in fastening flange 21 of housing 16 and mounting holes 23 in hydraulic block 1. Two screws, which, in general, may also be interpreted as screw elements or fastening elements 28, extend through through-holes 27, 22 in fastening part 25 and in fastening flange 21 of housing 16 forming mounting part 17, and are screwed through collars 24 of fastening flange 21, which are inserted into mounting holes 23 in hydraulic block 1, into the internal threads of mounting holes 23, by which fastening part 25 and mounting part 17 are fastened to fastening side 5 of hydraulic block 1.

Two threaded bolts protrude from a side of fastening part 25 facing away from hydraulic block 1 as stud bolts 29 for fastening hydraulic block 1 to the bulkhead of the motor vehicle, which is not shown. Fastening part 25 forms an adapter, which may be replaced by another, matching fastening part 25 for the adaptation to a bulkhead having a different perforation pattern.

For a power actuation of the vehicle braking system, hydraulic block 1 has a power cylinder borehole 30, in which a power piston, which is not shown and may also be referred to as a plunger piston, is displaceable with the aid of an electric motor via a planetary gear and a threaded drive. The electric motor, the planetary gear, and the threaded drive are not shown. The electric motor is fastened coaxially to power cylinder borehole 30 on the outside of hydraulic block 1, and planetary gear and threaded drive are also coaxially situated between the electric motor and the power piston. In the shown specific embodiment of the present invention, power cylinder borehole 30 extends perpendicularly through the two large sides of hydraulic block 1, i.e., power cylinder borehole 30 extends transversely to master brake cylinder borehole 2 on a side facing away from upper narrow side 3 of hydraulic block 1, beneath master brake cylinder borehole 2, through hydraulic block 1.

What is claimed is:

1. A hydraulic block for a hydraulic power unit of a hydraulic power vehicle braking system, comprising:
   a fastening side for fastening the hydraulic block to a bulkhead of a motor vehicle;
   a master brake cylinder borehole having an opening at the fastening side of the hydraulic block;
   at least one mounting hole outside the master brake cylinder borehole in the fastening side;
   a mounting part situated at the fastening side of the hydraulic block, the mounting part including an opening for a master brake cylinder piston, which covers the opening of the master brake cylinder borehole in the hydraulic block, and at least one through-hole which is aligned with the mounting hole in the fastening side of the hydraulic block; and a fastening part configured to fasten the hydraulic block to the bulkhead of the motor vehicle, the fastening part being situated on the mounting part and having a through-opening for the master brake cylinder piston, which: (i) covers the opening of the mounting part and/or (ii) encloses the mounting part and covers the opening of the master brake cylinder borehole in the fastening side of the hydraulic block, and the fastening part further including at least one through-hole, which covers the at least one through-hole in the mounting part and the at least one mounting hole in the hydraulic block;

wherein the mounting part and the fastening part are fastened to the fastening side of the hydraulic block using at least one fastening element, which extends through the through-holes of the mounting part and of the fastening part and in which at least one mounting hole is fastened in the hydraulic block;

wherein the mounting part includes a collar at the at least one through-hole, which clampingly engages in the at least one mounting hole in the fastening side of the hydraulic block and through which the at least one fastening element extends.

2. The hydraulic block as recited in claim 1, wherein the collar has an outer circumference deviating from an inner circumference of the mounting hole in the fastening side of the hydraulic block.

3. The hydraulic block as recited in claim 1, wherein the collar includes recesses.

4. The hydraulic block as recited in claim 1, wherein the mounting part is metallic and/or includes exactly two collars.

5. The hydraulic block as recited in claim 1, wherein the fastening part includes at least one stud bolt for fastening to the bulkhead of the motor vehicle, which protrudes from a side of the fastening part facing away from the hydraulic block.

6. The hydraulic block as recited in claim 1, wherein the mounting part is a hollow body, which is situated in an extension of the master brake cylinder borehole at the fastening side of the hydraulic block, which encloses the master brake cylinder piston protruding from the master brake cylinder borehole and which includes a fastening flange, which is situated at the fastening side of the hydraulic block and which includes the at least one through-hole for the fastening element for fastening to the hydraulic block.

7. The hydraulic block as recited in claim 6, wherein the fastening part is plate-shaped and rests on the fastening flange of the mounting part.

8. The hydraulic block as recited in claim 1, wherein the hydraulic block has a power cylinder borehole.

* * * * *